June 9, 1925.                                                    1,541,683
P. H. BUEHLER
LIFE, HEAVING, AND OTHER TYPES OF LINES
Filed Oct. 4, 1921            2 Sheets-Sheet 1
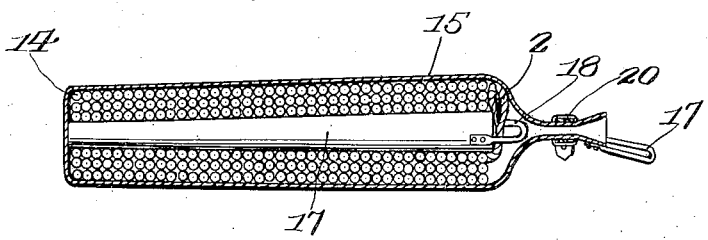
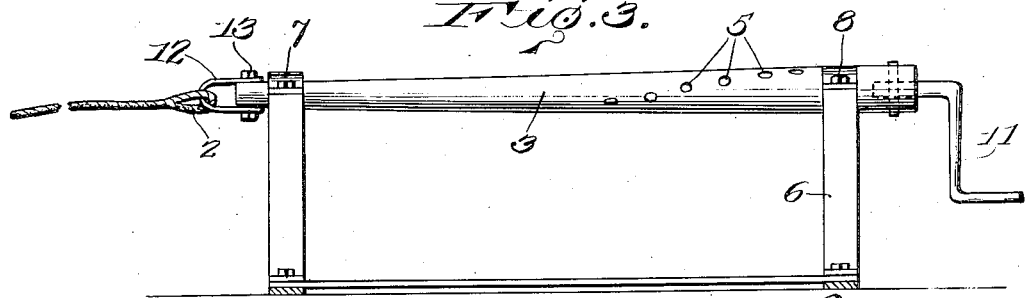
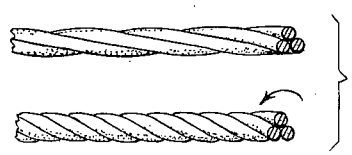
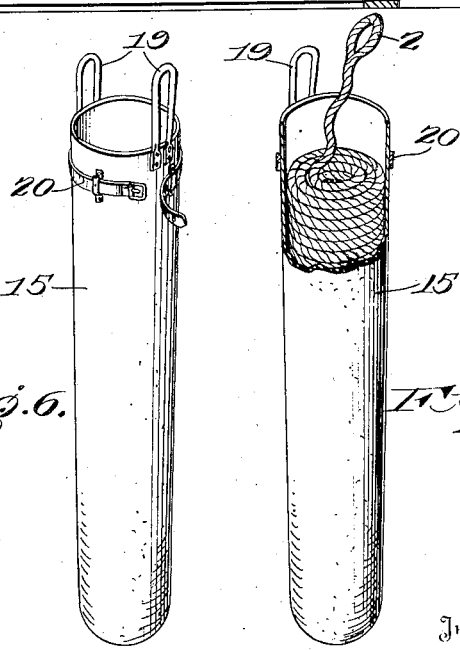
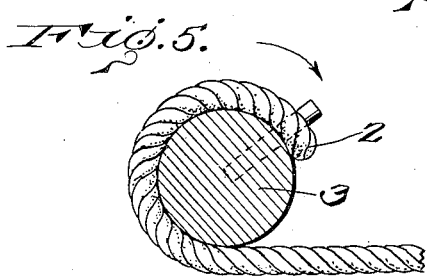
Inventor
Philip H. Buehler
By Helge Murray
his Attorney June 9, 1925. 1,541,683
P. H. BUEHLER
LIFE, HEAVING, AND OTHER TYPES OF LINES
Filed Oct. 4, 1921 2 Sheets-Sheet 2
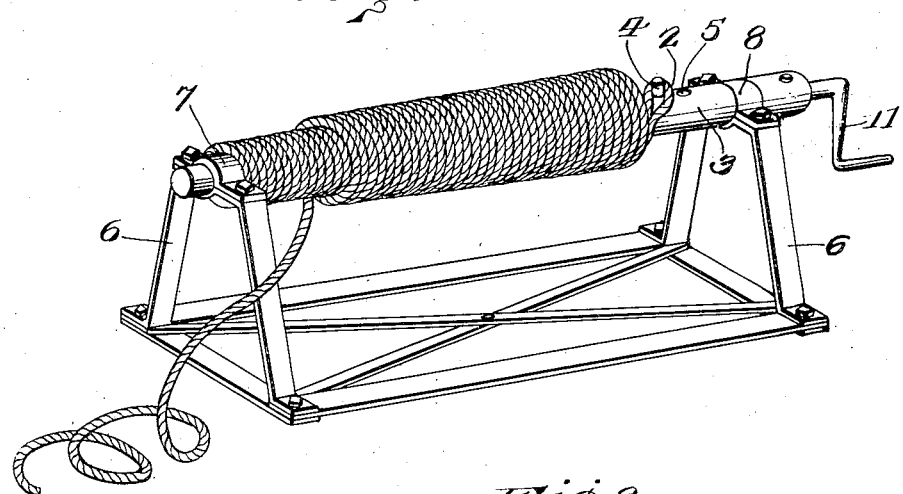
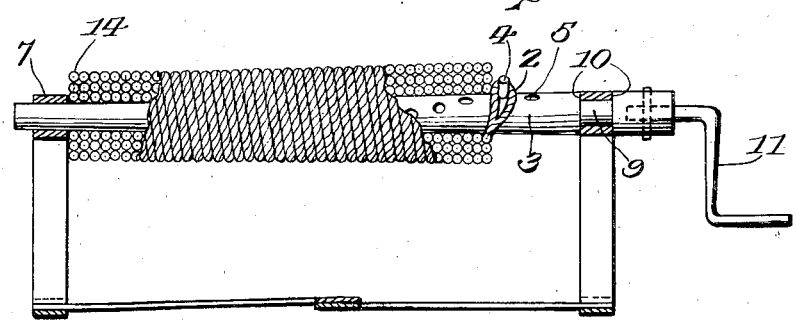
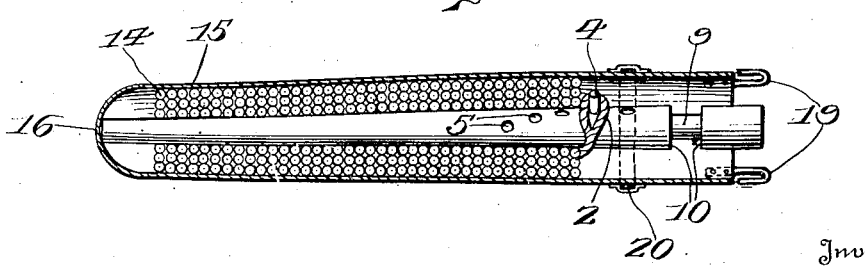
Inventor
Philip H. Buehler
By
his Attorney Patented June 9, 1925.

1,541,683

UNITED STATES PATENT OFFICE.

PHILIP H. BUEHLER, OF WASHINGTON, DISTRICT OF COLUMBIA.

LIFE, HEAVING, AND OTHER TYPES OF LINES.

Application filed October 4, 1921. Serial No. 505,438.

*To all whom it may concern:*

Be it known that I, PHILIP H. BUEHLER, a citizen of the United States, residing at Washington, in the District of Columbia, have invented certain new and useful Improvements in Life, Heaving, and Other Types of Lines, of which the following is a specification.

This invention relates to lines, ropes, cables and the like, arranged and adapted to be dropped, thrown, shot or otherwise used for life saving, heaving and other purposes.

Life, heaving and other types of lines are now wound or coiled in various ways for purposes of facilitating their easy and untangled delivery. Serious difficulties, however, are now frequently experienced when dropping or heaving life and other types of lines in that the line does not playout or uncoil free from tangles, twists and back lashing. In fire department use, for example, it is desirable to drop the line in a minimum amount of time and in an untangled and untwisted condition, ready for immediate use. The present methods of preparing and handling life lines are not certain, and as a result much time is frequently lost in properly launching the life line, thereby causing serious loss of life and property.

It is an object of my present invention to overcome these experienced difficulties, and produce life, heaving and other types of lines which can be easily prepared and used with an exceedingly high average of efficiency.

My invention also has for an object the production of a line which will quickly and smoothly uncoil without tangling, and free from any tendency to spin, twist or lash backwardly.

Another object of my invention is to provide a line the twisted and wound coils of which are held and stored within a relatively tight covering or jacket from which the line is unwound.

My invention further relates to the method of winding a line of the class described by first subjecting the line to an abnormal twist in one direction proportionate to the subsequent winding thereof, then winding said line in a reverse direction into coiled and compact layers so as to impart an opposite twist to the line, and finally applying a skin tight covering around the twisted and wound line.

The invention has for a further object the production of means for imparting the initial twist and subsequently winding the line in coiled formation ready for use.

With these and other objects in view my invention further consists in the arrangement and construction of the several parts hereinafter described and pointed out in the appended claims.

In the accompanying drawings:

Fig. 1 is a sectional view illustrating my improved line twisted, wound and stored within the covering, and provided with a temporary core section;

Fig. 2 is a sectional perspective view showing the line unwinding from the bag or covering when being dropped or thrown;

Fig. 3 is a view in side elevation showing a spindle device for putting the initial twist in the line and then coiling it, the line or rope being shown attached to the end of the spindle for receiving the aforesaid initial twist;

Fig. 4 is a view illustrating a twisted strand rope as normally formed and the same rope after receiving an increased twist in the direction of the arrow shown thereon;

Fig. 5 is a detail view illustrating the rope after receiving the initial twist, being wound or coiled in the reverse direction as indicated by the arrow;

Fig. 6 is a detail perspective view of the skin-tight jacket or bag which is fitted over the wound line;

Fig. 7 is a perspective view of the twisting and winding spindle;

Fig. 8 is a longitudinal sectional view showing a series of three layers of the rope or line wound upon the spindle; and Fig. 9 is a view showing the manner in which the skin-tight jacket or bag is drawn over and fitted upon the wound rope preparatory to withdrawing the winding spindle and inserting the temporary core section.

My present invention has been primarily designed for use as a life line in fire department work, although it will be readily understood that it is equally useful for heaving, life saving at sea, and many other uses, and I do not limit myself to any one in particular.

Referring to the drawings in which similar reference characters designate corresponding parts in the several views, the rope is of known construction, and formed of twisted, braided, or otherwise connected strands. I have illustrated a line composed of twisted strands, although any kind of flexible rope or cord can be prepared and handled in the practice of my invention.

When prepared as a life line for fire department use I form an eye splice 2 in one or both ends of the rope. The opposite free end of the rope is preferably wound or otherwise treated to prevent ravelling, but in some cases this end may be also spliced or otherwise provided with an appropriate attaching device.

The line 1 is preferably wound in layers upon a core or spindle 3, the eye splice 2 being secured to a pin projecting from the spindle. A series of openings 5 is provided in the winding spindle, the pin 4 being arranged for insertion in any one of said openings for purposes of determining the length of the layers desired. This adjustment is desirable in that either relatively long or short layers can be wound as the particular use of the line may require.

Devices other than the pin 4 may be employed for securing the rope to the spindle and I do not limit myself to the exact device shown.

The winding or coiling means includes the spindle 3 suitably mounted in bearings provided on the supporting frame 6. The spindle 3 is tapered, the smaller end being supported in the bearing 7 and the other end being mounted in the bearing 8. The size of the bearings is substantially the same, the spindle 3 being reduced as at 9 and formed with the shoulders 10 designed to bear against the sides of the bearing 7. In one end of the spindle I secure an operating crank 11 by means of which the spindle can be rotated. Any form of crank may be substituted as will be understood.

To the smaller end of the spindle I detachably secure a connecting device in the form of a shackle 12 to which the eye splice 2 is attached when imparting to the line the initial and abnormal twist (see Fig. 3).

In practice I prefer to employ a winding mechanism an embodiment of which I have disclosed for coiling or winding the line preparatory to its use, although it will be understood that the abnormal or initial twist can be imparted and the rope coiled or wound by a hand operation.

The winding means is employed to impart the initial or abnormal twist to the line, the eye splice 2 being attached to the shackle 12, and the latter secured to the small end of the spindle by means of a bolt 13 as shown for example, or in any other suitable manner. The spindle is now rotated and the increased twist is imparted to the line. The opposite free end of the line is held during this operation to prevent the escape of the twist, and the line is preferably laid straight out during the twisting operation. In practice I have found that if the line for example is 150 feet in length, then I rotate the spindle 150 times giving to the line a single twist for every foot thereof. The winding of the line upon the spindle is also a factor in that in the example given, it requires 150 revolutions of the spindle to wind the twisted line in layers thereon.

In Fig. 5 I have illustrated a portion of a twisted strand rope showing the twist as being applied to the rope in the direction of the arrow, or as what might be termed for the purposes of this illustration, a left-hand twist. In Fig. 6, the winding of the twisted line upon the spindle is diagrammatically shown, the rotating of the spindle being in a reverse direction to the left-hand twist as initially imparted. This reverse or right-hand revolving of the spindle is indicated by the arrow in said Fig. 6, and a twist opposite to the aforesaid initial twist is imparted to the line.

The winding or coiling of the twisted line is effected by removing the shackle 12 and affixing the eye splice 2 to the pin 4 which latter has been suitably positioned to provide for the proper length of layers. By rotating the crank the spindle 3 is revolved and the twisted line is wound thereon in relatively close contact as shown.

I have illustrated the line as wound in three layers, although it will be understood that any number of layers may be applied as found expedient.

The respective locations of the eye splice and the opposite free end of the line upon the completion of the winding operation, I regard as important. In practice I prefer these to be oppositely positioned with regard to the coiled line, with the eye splice arranged at the top end and upon the innermost layer, and the free end of the line positioned at the bottom end and upon the outermost layer. To accomplish this I select an order of odd numbers of layers such as 3, 5, 7, etc., for example. In the case of a single layer the respective ends would of course be opposite.

The free end of the line is indicated by the numeral 14 in Fig. 1.

Upon the completion of the winding operation, the spindle is removed from the bearings, and a covering or bag 15 is drawn over the coiled or wound rope whereupon the open end of the bag becomes the trailing end when being projected. In practice I remove the cap portion of the bearing 8 and slide the small end of the spindle out of the bearing 7.

The bag 15 is made of any suitable material, preferably flexible, and is arranged to closely fit the wound line to the degree of skin-tightness. In Fig. 9 the bag is shown drawn over the wound line, the winding spindle being still shown in place. With the bag in this position the bottom end 16 thereof is slightly tapped to loosen the spindle. The spindle is now withdrawn, the bag being drawn up snugly against the bottom of the wound line as shown in Fig. 1. A temporary core 17 may be inserted after the removal of the spindle, so as to prevent any tendency of the coiled line to become distorted. The core 17 is tapered similarly to the winding spindle, and at its upper end is provided with a strap or piece 18 for quickly removing the core. In practice the core is sometimes used as an anchorage means, the eye splice end being slipped over or otherwise secured thereto, and the core joined or caught in some object capable of sustaining the strains to which the line is to be subjected. In some cases it may not be necessary to use the temporary core, where for instance the length of the wound line is comparatively short.

The bag 15 is provided with handles 19 to facilitate the positioning of the bag upon the wound line, said handles also serving as a convenient means of transporting the line. A strap and buckle connection 20 is also provided around the neck of the bag whereby the top of said bag can be effectively closed down tight upon the wound line. When stored in the covering it will be seen that the line is protected against the elements and kept in proper wound condition for immediate use. The bag is of an appropriate weight proportional to the size of the line and is preferably tapered to correspond with the cone-like taper of the wound line. Variations in the construction of the bag covering may be resorted to and I do not limit myself to the exact construction herein.

In the use of my invention the bag is opened and the temporary core, if one is found in the wound line, is removed. The eye splice is now made fast, and the bag with the line therein dropped or hurled as the conditions and circumstances of its use require. The line immediately begins to feed out of the moving bag, the innermost layer first unwinding, then the next adjacent layer and so on until the line has been completely unwound. The slight taper given the winding has been found to provide a sufficient clearance and the smooth and rapid release of the line is obtained. In addition, the abnormal or increased twist first imparted to the line materially adds to the release of the coils, and any tendency of the line or rope to become set and sluggish is obviated. The initial twist given the line produces a spring-like tendency in its release from the bag and as a result the rapidity of its paying out is materially increased.

When the line has been released the free end 14 is in position for immediate use, the effect of the initial twist being to neutralize the winding of the line upon the spindle and prevent all tendency of back lashing, whipping or flapping of the line. The possibility of the line becoming tangled is practically eliminated, the paying out of the line from the respectively arranged odd number of wound layers assuring a direct feeding of the rope, with the free end lowermost or outermost as the case may be, according to its use.

I do not limit myself to the many uses to which a line twisted and wound in accordance with my invention may be put, nor to the particular means shown herein of preparing the line, but reserve the right to make such changes as will properly fall within the scope of the invention.

I claim:

1. The method of preparing a line adapted to be dropped or hurled free from twists, kinks and the like which consists in imparting an initial twist to the line, then winding said twisted line in a direction which will result in an opposite twist being imparted to the line, and finally applying means upon said line for retaining the same in twisted and wound condition, said means being dropped with the line for maintaining the coils thereof in position up to the time of their release and during the descent of the line.

2. The method of preparing a line adapted to be dropped or hurled free from twists, kinks and the like, which consists in imparting an initial twist to the line, then winding said twisted line in a tapered coil and in a direction which will result in an opposite twist being imparted to the line, and finally skinning a tapered covering about said twisted and wound line, said covering being dropped with the line and providing a receptacle which maintains the coils in their respective wound positions until released from said covering.

3. A packaged article comprising a line closely coiled in tapering adjacent layers with the ends of said line oppositely disposed, said line having imparted thereto a plurality of twists adapted to neutralize each other for permitting the descent or path of travel of said line straight and free from kinks, and a relatively light tapering cover closely fitting said layers from which the line is unwound with one end thereof suitably secured and the opposite free end thereof arranged so that it is the last portion of the line to leave said cover.

4. A wound or coiled line of the class described provided with opposite initial and winding twists respectively, said twists being normally confined in the wound or coiled line, and adapted to neutralize each other when the line is unwound, and a flexible covering adapted to be tightly closed about the line and designed to be dropped or hurled therewith In testimony whereof I affix my signature.

PHILIP H. BUEHLER.